D. R. ROBINSON

SEALING MACHINE

Filed Sept. 5, 1922

Patented May 19, 1925.

1,538,747

UNITED STATES PATENT OFFICE.

DONALD RICHARD ROBINSON, OF CHICAGO, ILLINOIS, ASSIGNOR TO ROSE MARY ROBINSON, OF CHICAGO, ILLINOIS.

SEALING MACHINE.

Application filed September 5, 1922. Serial No. 586,230.

*To all whom it may concern:*

Be it known that I, DONALD RICHARD ROBINSON, a citizen of the United States, and a resident of Chicago, in the county of Cook and State of Illinois, have invented a new and useful Improvement in Sealing Machines, of which the following is a full, clear, and exact description.

My invention relates to improvements in sealing machines, and it consists in the combinations, constructions, and arrangements herein described and claimed.

An object of my invention is to provide an improvement over that form of the device shown in the co-pending application of Rickard and Robinson for sealing machine, Serial No. 480,900, filed June 27, 1921, now Patent 1,435,334, issued November 14, 1922. In said prior patent there was disclosed a sealing machine which was adapted to automatically seal booklets, leaflets, or the like, as they passed through the machine, and which also had automatic means for placing the machine in inoperative condition when the booklets were not being fed through the device. The present form of the device operates substantially in the same manner, but has a number of improvements which will form the subject matter of my present application. One of these improvements is a novel automatic booklet feeding mechanism which is adapted to feed the booklets or leaflets one at a time to the machine.

A further object of my invention is to provide a device of the character described which has a novel and improved means for throwing the machine into inoperative position when the folders or leaflets are not being fed through the device, this means being positive in action.

A further object of my invention is to provide a device of the character described which has an improved type of sucker head for removing the seals from the magazine and placing them upon the leaflets.

A further object of my invention is to provide a device of the character described which has means for rotating and for controlling the vertical position of the wetting roller before the latter engages with the seal.

A further object of my invention is to provide a crimping finger which is adjustable so as to be readily positioned with respect to the pressing rollers.

A further object of my invention is to provide a device of the character described in which the pressing rollers are mounted on dead centers and are actuated by the folders passing therebetween, whereby the seal is smoothed out and firmly pressed upon the folder as it passes between the rollers.

A further object of my invention is to provide a device of the character described which has novel tape rollers that are adapted to keep the folder in frictional engagement with the tape.

A further object of my invention is to provide a device of the character described in which the various parts of the machine are adjustable so as to permit the desired positioning of the parts so as to obtain the most efficient operation.

Other objects and advantages will appear in the following specification, and the novel features of the invention will be particularly pointed out in the appended claims.

My invention is illustrated in the accompanying drawings, forming part of this application, in which.

In carrying out my invention, I provide a frame 1 which is made of cast iron or other like material, and which supports at its front end a folder feeding mechanism, this mechanism being shown in Figures 1, 2, 3, and 4. It will be noted from Figures 1 and 3 that the feeding mechanism comprises angle irons or polished metal angular strips 2 which are carried by brackets 3, these brackets in turn being supported by upright supports 4. It will be noted that the supports 4 are adjustably carried by lock nuts 5, whereby the angle irons 2 may be moved up and down and tipped to any angle desired. Furthermore, the supports 4 are carried by a plate 6 which is slidably disposed on a bracket 7 that is secured to the frame 1. In this manner, the angle irons 2 may be moved toward and away from the front of the machine. The supports 4 are connected to the plates 3 by means of rods 8, thus permitting the angle irons 2 to be moved laterally with respect to each other, whereby the feeding of various sized folders may be done. In case the folders are of very great length, an auxiliary plate 9 (see Figure 2) is disposed between the angle irons 2 and is carried by the rods 8. The lower ends of the angle irons 2 are secured to arms 10 by set screws 11, whereby the angle irons are firmly held in adjusted position. The lower ends of the angle irons 2 are positioned adjacent to rubber feed belts 12 which are in reality endless belts that are mounted upon rollers 13 and 14. The rollers 14 are carried by an arm 15 which is pivotally secured at its lower end to a bracket 16, the bracket in turn being adjustably secured to the frame 1 by means of bolts 17. From this construction it will be apparent that the arm 15 may be swung so as to vary the tension of the belts 12, and that the bracket 16 may be moved vertically so as to vary the feeding angle of the belts 12. The folders 18 rest upon the belt 12 and are conveyed to a novel mechanism which permits only one folder to pass into the machine at a time.

Figure 1:
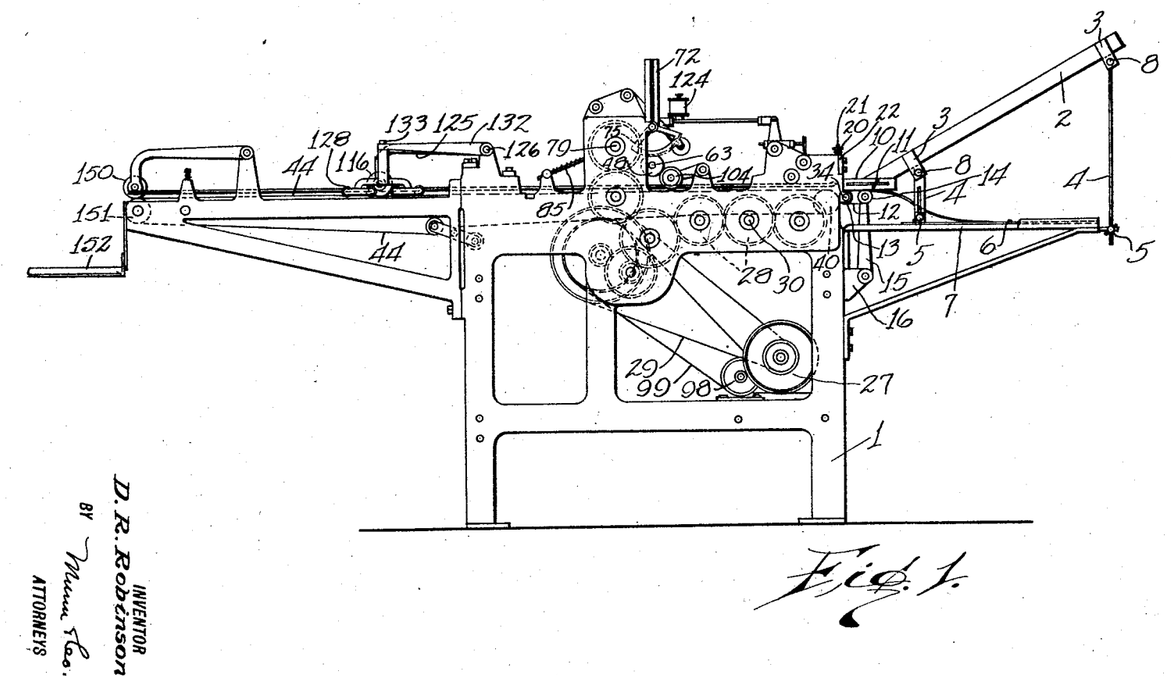
Figure 1 is a side elevation of the device.
Figures 2, 13, 15:
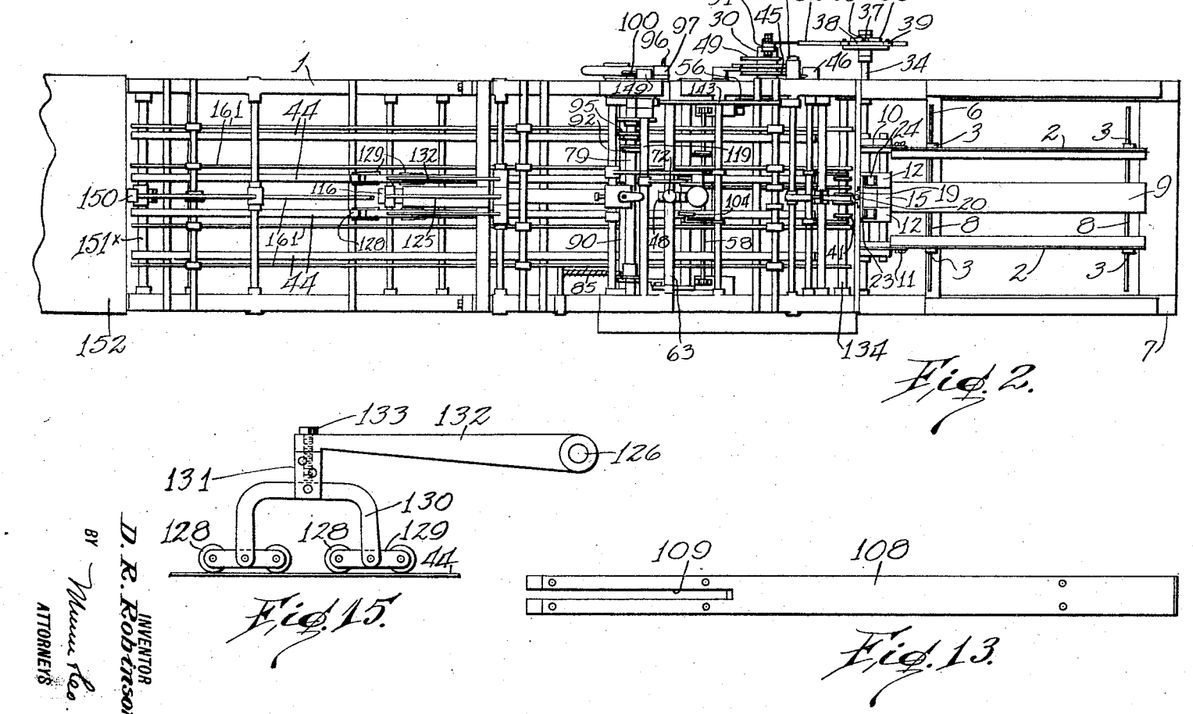
Figure 2 is a plan view of the device.
Figure 13 is a plan view of the seal crimping finger mechanism.
Figures 15 is a side elevation of the novel type of tape rollers.
Figures 3, 17:
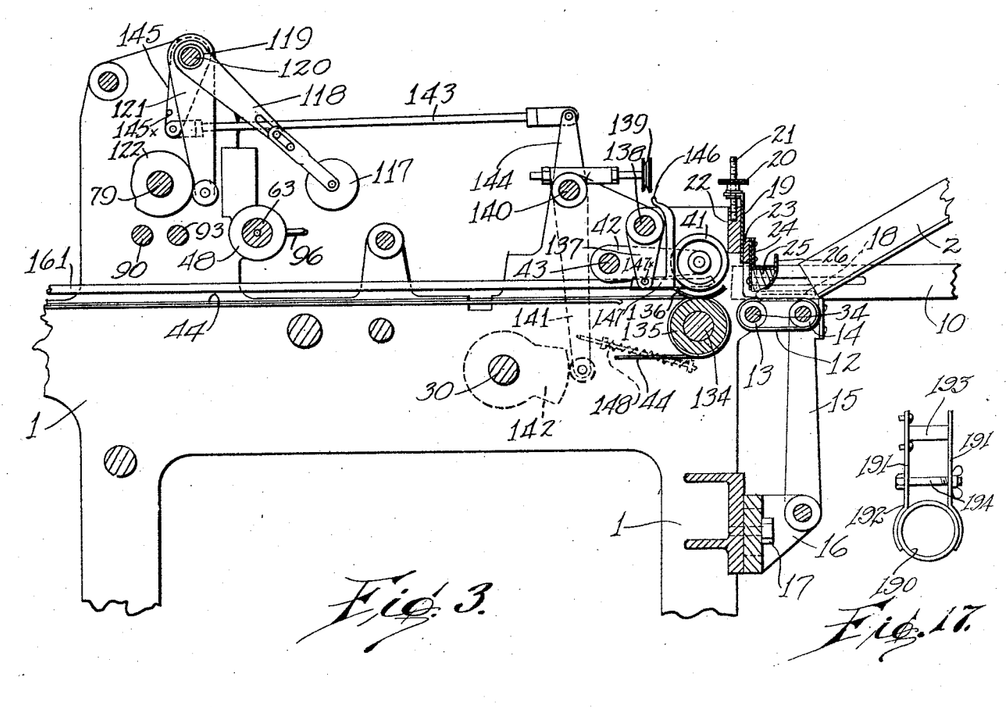
Figure 3 is a vertical section of a portion of the device.
Figure 17 is a modified form of a portion of the means for feeding booklets into the machine.

This mechanism is clearly shown in Figures 2 and 3 and comprises a vertical support 19 which is adjustably carried by an adjusting screw 20 that is mounted on a stud 21 which in turn is carried by a cross bar 22 of the frame 1. A cross bar 23 is secured to the lower end of the support 19 and in turn carries frames 24 which have quadrant-shaped rubber members 25 therein. The frame 24 encloses all of the member 25 except the lower portion thereof which is disposed directly above the belts 12. By adjusting the screw 20, the member 25 may be moved toward or away from the belt 12 so as to vary the space between the belts 12 and the rubber members 25 at will. This space is adjusted so as to permit only one booklet or leaflet to pass into the machine at a time. The member 25 provides enough friction to the leaflet above the leaflet passing into the machine, so as to prevent the second leaflet from moving until the first leaflet has passed into the machine. The front surface of the member 25 is enclosed by a metal plate 26 which permits the leaflets to readily drop down upon the belt 12. In Figure 2 it will be observed that I have provided two members 25 in the present form of the device.

Figure 4:
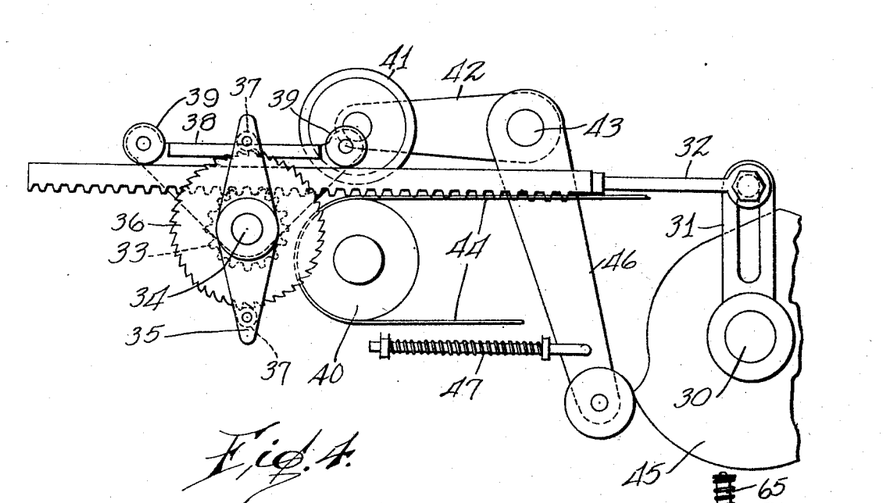
Figure 4 is a side elevation of the feeding mechanism.

The belts 12 are actuated intermittently by the mechanism shown in Figure 4, the belts being so timed that they will carry a folder into the machine so that the folder will reach the sealing head at the desired instant. The machine is actuated by a motor 27 which is in turn connected to a train of gears 28, shown in Figure 1, by a belt 29. A cam shaft 30 is rotated by the gear train 28 and carries an arm 31 to which a rack 32 is pivotally secured. The rack is disposed over a pinion 33 which is mounted upon a shaft 34 which carries the roller 13. The pinion 33 is loosely mounted upon the shaft 34 and will be oscillated by the rack 32 when the cam 30 is actuated. A plate 35 is also loosely mounted upon the shaft 34 and is rigidly secured to the pinion 33 so that when the pinion 33 is oscillated, the plate 35 will also be oscillated. A ratchet 36 is rigidly secured to the shaft 34 and is connected to the plate 35 by means of spring pressed pawls 37 which are carried by the plate 35. From this construction it will be observed that the ratchet 36 will be moved in one direction intermittently by the action of the rack 32, the pinion 33, and the plate 35. It is obvious that the movement of the ratchet 36 will also move the belts 12. In this manner the belts 12 are moved at the required time so as to force a folder past the members 25 and into the machine. A guide plate 38, having rollers 39 thereon, keeps the rack 32 in engagement with the pinion 33.

As soon as the folder has passed between the belts 12 and the members 25, it is conveyed between the rollers 40 and 41. The rollers 41 are carried by arms 42 which are rigidly mounted on a cross shaft 43 (see Figure 3). In Figure 4 I have shown the means which actuates the shaft 43 so as to cause the rollers 41 to come into contact with the folder conveying tapes 44 and with the rollers 40. When this action takes place, the folder is frictionally gripped and is carried forward into the machine by the tapes 44. The means for dropping and raising the rollers 41 is clearly shown in Figure 4 and comprises a cam 45 which is mounted upon the cam shaft 30 and which is adapted to actuate a cam arm 46 which is rigidly secured to the shaft 43. The cam arm 46 is yieldingly held in engagement with the cam 45 by means of a spring pressed rod 47. The cam is shaped so as to cause the rollers 41 to drop at the desired time so as to carry the folder into the machine.

Figure 5:
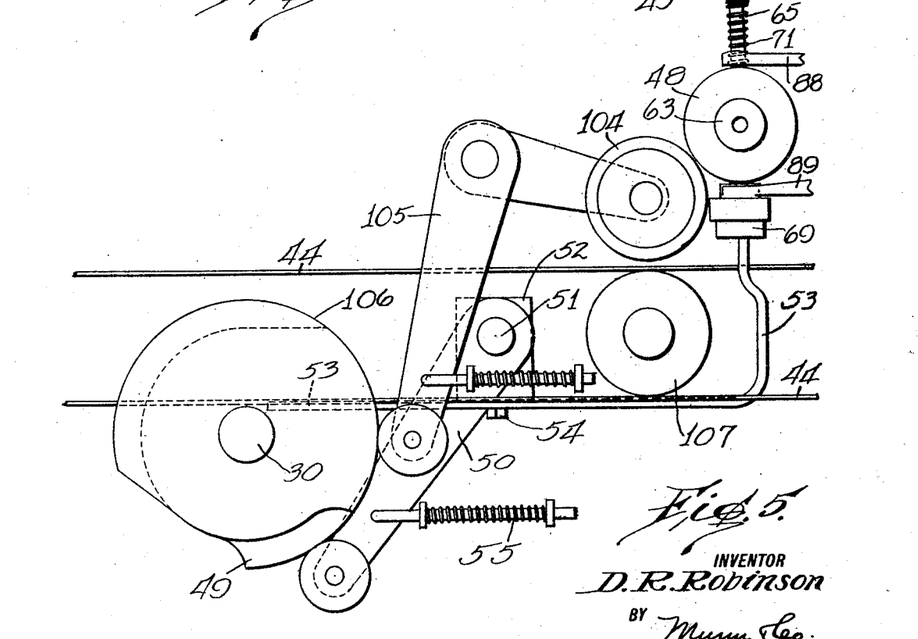
Figure 5 is a side elevation of the starting and stopping mechanism which is disposed adjacent to the sucker head.

The folder is carried along by the tapes 44 until it reaches the sealing head 48. In Figure 5 I have shown a means for stopping the folder in the right position with respect to the sucker or sealing head 48, this means being actuated by a cam 49 which is mounted upon the cam shaft 30. The cam 49 actuates a cam follower 50 which is rigidly secured to a cross shaft 51, the shaft carrying a block 52. Leaflet stops 53 are adjustably secured to the blocks 52 by means of set screws 54. It is obvious that the rotation of the cam 49 will raise and lower the fingers 53 into and out of engagement with the leaflets, whereby the leaflets are stopped in the desired position. A spring pressed rod 55 keeps the cam follower 50 in engagement with the cam 49. In Figure 5 the fingers 53 have been adjusted so as to stop the edge of the booklet in the center of the sucker head, whereby a seal in being disposed on the booklet will have half of its portion projecting beyond the edge of the booklet.

Figure 6:
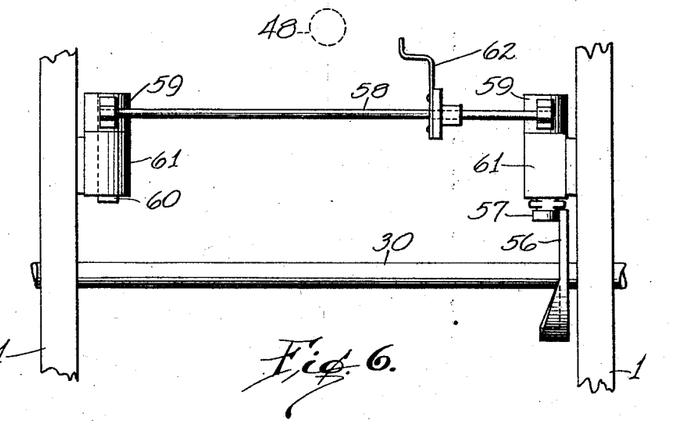
Figures 6 and 7 are a plan and sectional view of the means for moving the leaflets laterally with respect to the sucker head.
Figure 7:
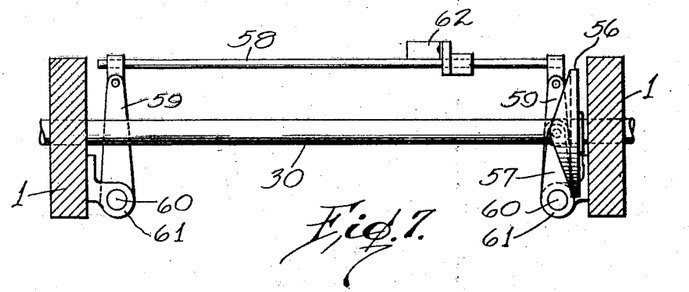

In Figures 6 and 7 I have shown the mechanism for moving the booklet laterally so as to position it with respect to the sucker head 48. This means comprises a cam 56 which is mounted upon the cam shaft 30 and which actuates the cam follower 57 so as to oscillate a transversely extending rod 58. The rod 58 is carried by arms 59 which are secured to stub shafts 60, the latter being carried by brackets 61. When the cam 56 is actuated, it will move the guide strip 62 into engagement with the booklet so as to position the booklet with respect to the sucker head 48. The strip 62 is adjustable upon the rod 58 so as to permit various sized booklets to be handled by the machine. The fingers 53 and the guide strip 62 position the booklet longitudinally and laterally with respect to the sucker head so that the seal carried by the sucker head will be placed upon the booklet in the desired position.

Figures 8, 10, 11:
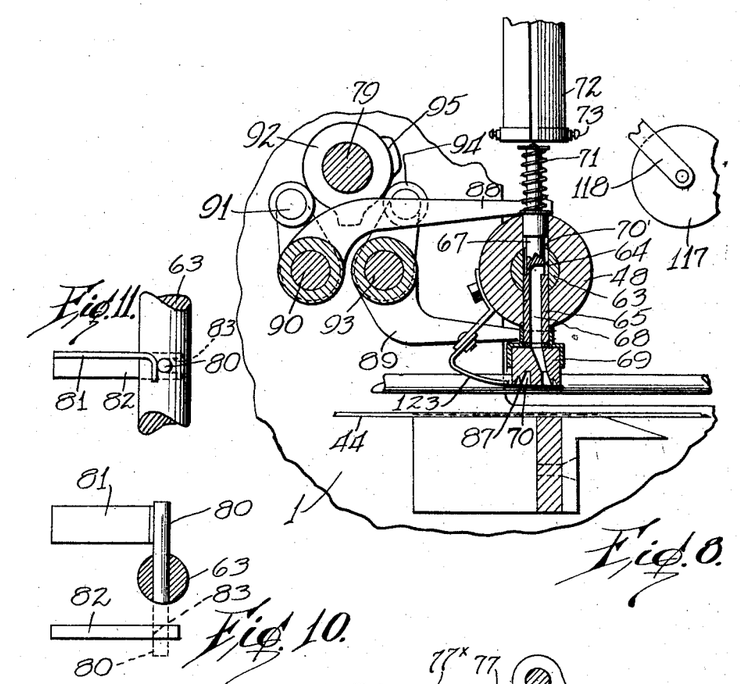
Figure 8 is a vertical section of the sucker head and the parts cooperating therewith.
Figures 10 and 11 are a side and plan view of the means for stopping the sucker head at the end of its rotative movement.
Figure 9:
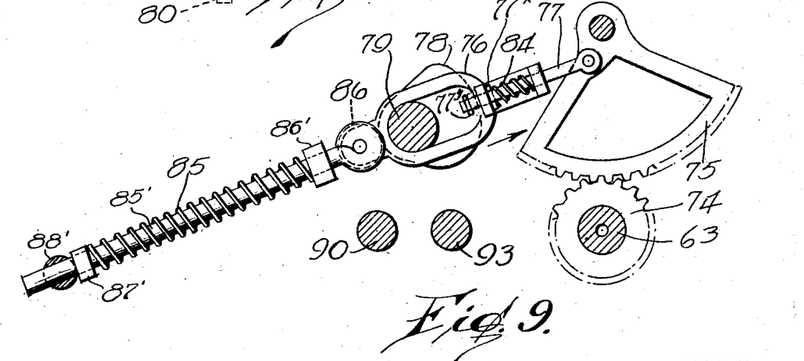
Figure 9 is a diagrammatic view of the mechanism for rotating the sucker head.

The sucker head and its associate mechanism is clearly shown in Figure 8. It will be noted that a hollow shaft 63, journalled in the frame 1, has a transverse opening 64 therein, through which a plunger 65 is slidably disposed. If the casing 48 were not provided, there would not be sufficient area to seal the vents at the end of the plunger. The air is led in through the hollow shaft into the transverse opening 70', thence through the passageway 68, and to the rubber sucker. The fit between the plunger and casing prevents the air from escaping. The plunger has an annular recess 67 which is in alinement with the opening 64. The plunger 65 also has an air duct 68 which communicates with the groove 67 and with a resilient sucker head 69. The sucker head has two annular grooves 70 in its lower surface, these grooves being placed under vacuum by a mechanism hereinafter disclosed. The sucker head 48 is firmly secured to the shaft 63 and is adapted to be rotated with the shaft. The sucker head has a transverse opening 70' which is alined with the opening 64 and through which the plunger 65 extends. A spring 71 keeps the sucker head 69 in close engagement with the casing 48 of the sucker head. In Figure 9 I have shown the means for rotating the shaft 63 in an arc of 180 degrees, whereby the head 69 is carried from the position shown in Figure 8 into a position spaced 180 degrees therefrom. It will be noted that a seal carrying magazine 72 is disposed directly above the sucker head and is adapted to receive the head 69. Adjusting screws 73 are carried by the lower end of the magazine 72 and have needle-shaped heads which prevent the seals from dropping through the magazine. When the head 69 is within the magazine, it removes one seal from the magazine at a time.

Means for rotating the sucker head comprises a pinion 74 which is rigidly mounted upon the shaft 63 and which is in mesh with a sector 75. The sector is actuated by a cam follower 76 and a spring pressed rod 77. The rod 77 is slidably received in openings in lugs that are carried by the cam follower 76. Cotter pins 77$^x$ and 77$^y$ are secured to the rod 77 and are disposed on each side of one of the lugs of the cam follower 76 and are spaced from each other a sufficient distance to permit movement of the rod 77 relative to the lug. The cam follower 76 is actuated by the cam 78 which is on a second cam shaft 79. The cam shaft 79 is actuated by the train of gears 28 in the same manner as the cam shaft 30 is actuated by the gears. When the cam 78 rotates, it moves the cam follower 76 and the pin 77 so as to oscillate the sector 75 which in turn oscillates the shaft 63. It will be noted from Figures 10 and 11 that the shaft 63 carries a pin 80 which is adapted to abut against a stop 81 when the sucker head is in upright position, and which is adapted to abut against a stop 82 when the sucker head is in the position shown in Figure 8. The stop 82 has a fork-shaped recess 83 which is of slightly less diameter than is the diameter of the pins 80. The sides of the member 82 frictionally engage with the pin 80 and are sprung slightly apart so as to bring the pin to a gradual stop instead of to an abrupt stop. The spring 84 mounted upon the rod 77 permits a slight movement to take place between the follower 76 and the rod 77 in case the head 69 should be stopped before the follower 76 is at the end of its movement. A spring pressed rod 85 that is pivotally mounted on the shaft that carries the roller 86 keeps the cam roller 86 in engagement with the cam 78 during the entire rotative movement of the cam 78. The spring 84 normally keeps the pin 77$^x$ abutting the lug so as to have the rods 77 and 85 operate as a unit. When the cam follower 76 is moved in the direction of the arrow shown in Figure 9, and the head 69 should suddenly come to a stop, the pinion 74 and the sector 75 would stop and the roller 86 would ride free of the cam 78. The spring 85 which normally keeps the roller 86 on the cam 78 would be held in compressed position by the locked pinion 73 and the sector 75. When the follower is moving in the opposite direction, and the head 69 suddenly comes to a stop, the movement is taken up by the spring 84. In this case the right hand lug compresses the spring 84 and the cotter pin 77$^x$. In this manner, the sucker head is stopped in the desired positions before it enters the magazine 72 and before it places the seal 87 upon the folder. When the frame 76 is moved forward under pressure of the spring 85, pressure is transmitted to the rod 77 through the medium of the cotter pin 77$^x$. When the cam 78 drives the frame 76 in the opposite direction, the pressure is transmitted from frame 76 to spring 84 against cotter pin 77$^x$ and thence to the rod 77. In case of a jam in the machinery for any cause, the spring 84 will be compressed until frame 76 comes in contact with outer pin 77$^y$ and if quadrant 75 at this point fails to move, cotter pin 77$^x$ will shear, preventing damage to quadrant 75 or gear 74.

The head 69 is moved into the magazine 72 to obtain a seal and is moved into engagement with the folder to place the seal upon the folder by means of arms 88 and 89. The arm 88 is really a fork and is adapted to straddle the plunger 65. The arm 88 is carried by a transverse shaft 90 which is journalled in the frame 1. A cam follower 91 is rigidly secured to the shaft 90 and is adapted to be actuated by a cam 92 which is mounted upon the cam shaft 79. In like manner, the arm 89 is in reality a fork which straddles the plunger 65 and is mounted upon the shaft 93 which is actuated by a cam follower 94 that is in engagement with a cam 95. It is obvious from this construction that when the cam shaft 79 is rotated, it will actuate the arms 88 and 89 so as to move the head 69 away from the sucker head casing 48. The head 69 is brought back into engagement with the casing 48 by means of the springs 71. The movements of the arms 88 and 89 are timed so as to move the head 69 when the head is adjacent to the arms. In the showing in Figure 8, it will be noted that the head 69 is disposed adjacent to the arm 89 and that the cam 95 is ready to actuate the arm 89 so as to move the head 69 into engagement with the folder. When the sucker head 69 is disposed 180 degrees from the position shown in Figure 8, the cam 92 will then be ready to actuate the arm 88 so as to move the head into the magazine 72. A pipe 96 communicates with the hollow shaft 63, with a vacuum cut off 97 (see Figure 14), and with a vacuum pump 98 (see Figure 1). The pump 98 is actuated by a belt 99 which is driven by the motor 27. When the machine is started, and the cut off is closed, suction will be created in the head 69 so as to hold the seal 87 onto the head. Means is provided for releasing this vacuum when the seal is impressed upon the folder, whereby the seal will be left on the folder when the head 69 is lifted therefrom. This is accomplished by a cam 100 (see Figure 14) which is mounted upon the cam shaft 30 and which is adapted to actuate a plunger 101. The plunger 101 moves a gasket 102 into and out of engagement with the open ends of a recess 103. When the gasket is in the position shown in Figure 14, the air will be drawn through the open end of the recess by the vacuum pump 98 instead of being drawn through the sucker head. When the valve 102 is closed, the vacuum will be closed to the sucker head, whereupon the sucker head will grip a seal when brought into engagement therewith. A spring 153 tends to seal the valve 102 so as to close the vacuum from the pump to the sealing head. It will be noted that the cam 100 has a relatively small "high spot" so that the vacuum will be cut off for a relatively short length of time. This short length of time is necessary for the disposing of the seal upon the booklet. The head is removed from the booklet and is carried to the magazine, and again back to the booklet, during which time it is placed under vacuum.

Before the seal is placed upon the booklet, it is moistened by a wetting roller 117 (see Figures 3 and 8). The roller 117 is carried by an adjustable arm 118 which is mounted upon a sleeve 119 that is loosely mounted upon a cross shaft 120. The cam follower 121 is rigidly secured to the sleeve 119 and is actuated by a cam 122 which is carried by the cam shaft 79. The cam 122 is shaped so as to cause the roller 117 to move into engagement with the head 69 when a seal is carried by the head. As clearly shown in Figure 8, the sucker head casing 48 carries a cam plate 123 which engages with the wetting roller 117 before the latter comes into contact with the seal 87. This plate 123 starts the roller 117 to rotate, whereupon the roller is rotating at a uniform speed with respect to the seal as it passes thereby. If the roller 117 were rotated by the head 69, which is carrying the seal, the seal would be crumpled or bent as it came into contact with the roller. The construction of the plate 123 provides a novel means for starting the rotation of the roller 117 before the latter comes into contact with the seal. A water reservoir 124 is disposed above the roller 117 and has a valve (not shown) which regulates the amount of water permitted to flow upon the roller. In this manner, the roller is kept sufficiently moist to be able to moisten all of the seals as they are carried thereby. When a seal is removed from the magazine by the sucker and is carried toward the wetting roller, the wetting roller 117 first contacts with the bridge 123 which is adjusted to such an elevation that it will rotate the wetting roller 117 and will raise it to an elevation approximately equal to the elevation of the face of the rubber sucker.

Figure 12:
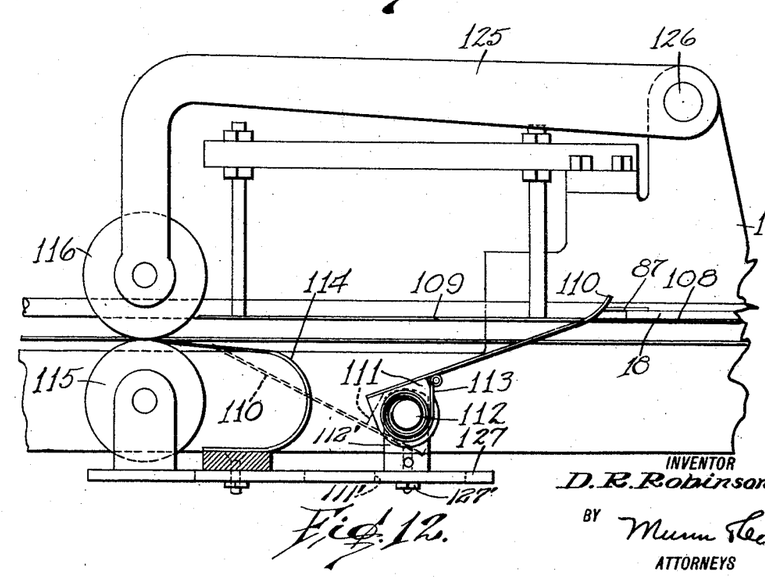
Figure 12 is a side elevation of another portion of the device.

As heretofore stated, the seal is placed upon the booklet so that a portion thereof projects beyond the edge of the booklet. The booklet is then started on through the machine by a drop roller 104. This drop roller is actuated by a cam follower 105 (see Figure 5) which is in rolling contact with a cam 106. The roller 104 is designed to drop upon a roller 107 as soon as the fingers 53 and the guide strip 62 are moved out of engagement with the booklet. The roller 104 causes the booklet to frictionally engage with the tapes 44, whereupon the booklet is carried away from the sucker head 48. The booklet in passing from the sucker head 48 is conveyed between the tapes 44 and a crimper finger guide strip 108. This guide strip is clearly shown in Figure 13 and it will be noted that it has a slot 109 therein through which the seal crimping finger 110 moves. The finger 110 is mounted upon a block 111 which is secured to a stub shaft 112 mounted on an adjustable block. The block 112' is slidably secured to the plate 127 by means of a bolt 127' that is disposed in a slot 111' in the plate. A spring 113 tends to keep the finger 110 in the full line position shown in Figure 12. When the booklet 18 strikes the finger 110, the seal 87 is bent downwardly and then upwardly against the under side of the booklet, as the booklet moves by the finger. The finger is thrown from the full line position shown in Figure 12 into the dotted line position as the booklet 18 passes thereby. Auxiliary fingers 114 engage with the seal and keep it abutting against the under side of the booklet after the seal has passed the finger. The seal is then conveyed to the pressing rollers 115 and 116. The rollers are mounted on dead centers so as to move easily. It should be noted that these rollers are not positively actuated, but are actuated by the booklet passing therebetween. In this manner the seal is smoothed out as it passes between the rollers and is firmly pressed upon the booklet, whereupon the seal will not become loose after passing from the machine.

The roller 116 is carried by an arm 125 which is pivotally mounted on a shaft 126. The arm 125 may be swung upwardly so as to carry the roller 116 away from the tapes 44 in case the part of the machine adjacent to the roller needs attention. The finger 110, the fingers 114, and the roller 115 are adjustably mounted upon a plate 127, which in turn is adjustably carried by the frame 1. The folder is held in engagement with the tapes 44 as it passes by the finger 110, by tape rollers 128 (see Figures 1 and 15). The rollers 128 are in pairs and are carried by links 129 which are pivotally connected to a yoke 130, which in turn is secured to a plate 131. The plate 131 is pivotally connected to an arm 132 by means of a bolt 133. The bolt 133 may be tightened after the rollers 128 are alined with the tapes 44. In this manner, the rollers are alined with the tapes and will not cause the tapes to run off the pulleys when the device is actuating.

Figures 14, 16:
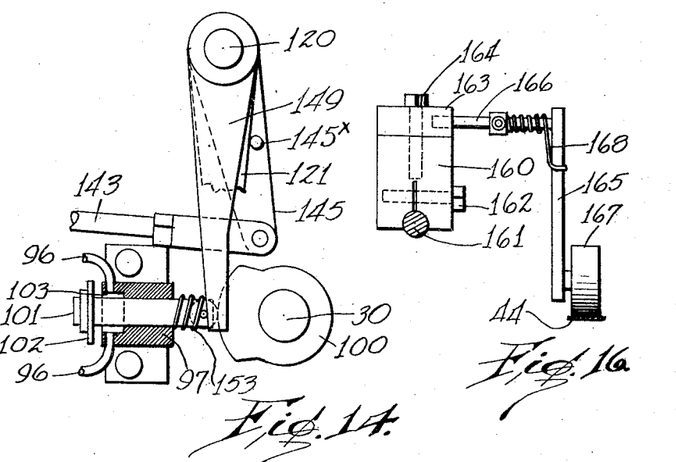
Figure 14 is a diagrammatic view of the automatic cut off for the exhaust.
Figure 16 is a modified form of tape roller which may be used with the device.

In Figures 3 and 14, I have shown a novel mechanism for cutting off the vacuum and throwing the wetting roller into inoperative position when a folder is not received by the machine. It will be noted in Figure 3 that a shaft 134 carries a grooved pulley 135 in which a finger 136 is slidably disposed. A booklet in passing into the device must raise the finger 136 out of the groove as the folder passes over the grooved pulley 135. The finger is secured to a frame 147 which is pivotally mounted at $147^x$ on a frame 137 which is carried by a cross shaft 138. A caliper 139 is secured to a cross shaft 140 and is adapted to be oscillated by a cam follower 141 which engages with a cam 142. The cam 142 is mounted on the cam shaft 30. A link 143 is connected to an arm 144 which is secured to the shaft 140 and to an arm 145 which is secured to the shaft 120. From this construction it will be apparent that when the shaft 140 is rocked, it will oscillate the caliper 139 and also oscillate the shaft 120. When the cam follower 141 is passing over the high spot of the cam 142, the caliper 139 is raised above the pointed end 146 of the frame 147. When the caliper is in this position, a pin $145^x$, carried by the arm 145, does not engage with the cam follower 121, thereby permitting the cam follower to engage with the cam 122. As soon as the high spot of the cam 142 has passed the follower 141, the follower will be swung by the spring pressed rod 148 so as to cause the caliper to move downwardly and to cause the pin 145$^x$ to swing the follower 121 out of engagement with the cam 122. The arm 145 keeps the follower 121 out of engagement with the cam 122, and also the wetting roller 117 out of engagement with the sucker head 48. This prevents the wetting roller from engaging with the sucker head when the latter has no seal thereon. When a folder does pass through the device, it raises the finger 136 so as to cause the point 146 of the frame 147 to be received in the caliper 139 and to hold the caliper in raised position, whereby the pin 145$^x$ will not engage with the follower 121 to prevent the movement of the latter. The follower 121 will now be actuated by the cam 122 so as to cause the roller 117 to engage with the sucker head as it passes thereby. The weight of the roller 117 and the arm 118 causes the cam follower 121 to contact with the cam 122 unless held out of engagement by the pin 145$^x$ as heretofore described.

The arm 145 in swinging so as to throw the follower 121 out of engagement with the cam 122, also swings an arm 149 (see Figure 14) which opens the cut out 97. The arm 149 engages with the plunger 101 which moves the valve 102 away from the recess 103. The opening of the cut out cuts off the vacuum to the sucker head and therefore the sucker head will not remove a seal from the magazine 72. It will therefore be observed that when the finger 136 is down in the grooved wheel 135, the cut out is held open through the rest of the operation of the device and the wetting roller is prevented from engaging with the sucker head. In this manner, the machine is provided with an automatic means for preventing any more seals from being withdrawn from the magazine and for also preventing the sucker head from being moistened by the wetting roller when no folders are passing through the device. Moreover, the means for placing the wetting roller in inoperative position is positive in action, since the folder positively raises the finger out of the grooved wheel 145 before the folder can pass into the machine.

From the foregoing description of the various parts of the device, the operation thereof may be readily understood. The folders to be sealed are placed in the feeding end of the device and are held by the angle irons 2. The angle irons are set so as to receive the folders, and to permit them to slide down onto the feed belts 12. The slide 19 is adjusted so as to permit one folder to pass into the machine at a time. As heretofore stated, this adjustment can be made for various sized folders, whereby the machine can handle any type of folder desired. Furthermore, the belts 12 can be inclined downwardly or upwardly with respect to the rollers 13 so as to take care of different kinds of stock. When the device is sealing what is commonly known as enameled stock, the belt is tilted upwardly so as to cause the edge of the stock to more firmly engage with the members 25, whereby the stock will be more readily carried into the machine. The members 25 prevent more than one folder at a time from entering the machine, and the timing of the belt 12 in its movement causes the folders to enter the machine at the required time. The folders upon entering the machine, actuate the finger 136 so as to permit the wetting roller 117 and the cut out to function in their normal capacities. The folders are then carried forward by the tapes 44 and are stopped in their progress by the fingers 53. The fingers 53 hold the folder in place and in the desired position while the seal is being placed thereon by the sucker head. It is obvious that by adjusting the fingers 53, the seal may be placed on the center or in any other place upon the booklet. Some folders are sealed along their mid portions instead of along their edges. It is obvious that the device will place the seal at any position desired. After the seal has been placed upon the folder, the fingers 53 drop out of the way and permit the tapes to carry the folder forward to the seal crimping finger. The drop rollers 104 cause the tapes to quickly carry away the folders from the sealing portion of the device so as to permit the next folder to come beneath the sucker head. The folder in passing by the seal bending finger is engaged by the finger so that the seal on the folder is bent downwardly and then up into engagement with the underside of the folder, whereby the seal is effectually bent around the folder. The fingers 114 prevent the seal from disengaging with the folder before the folder is passed between the pressing rollers 115 and 116. As heretofore stated, the rollers 115 and 116 are not positively driven, but are rotated by the folder passing therebetween. In this manner, the seal is not partially removed from the folder before it is pressed onto the folder, but a wiping contact is made on the seal which draws it onto the folder, smooths out the seal, and presses it firmly around the folder. The folder then passes on and is once more passed through two pressing rollers 150 and 151. At this point the folder is firmly sealed and is ejected into a tray 152, or other like receptacle. The rollers 150 and 151 are driven by the tapes 44 through the medium of the shaft 151$^x$. Moreover, the rollers 116 and 150 are mounted on arms which are pivotally carried by the frame 1, whereby the weight of the rollers will provide the necessary pressing to the seal as it passes therebetween.

In case no folders are fed into the machine, the finger 136 will not be moved out of engagement with the grooved wheel 135. As heretofore stated, this causes the pin 145$^x$ to engage with the cam follower 121 to prevent the operation thereof and thereby prevent the wetting roller from engaging with the sucker head. The arm 149 also engages with the plunger 101 and holds the valve 102 open against the tension of the spring 153, whereby vacuum to the sucker head is cut off. This prevents the sucker head from removing the seal from the magazine.

In Figure 16 I have shown a modified form of tape wheel, this form being used in connection with the tape wheel heretofore described if desired. This form of tape wheel comprises a split block 160 which is slidably mounted upon one of the rods 161 which extends the entire length of the machine. These rods normally keep the folders down upon the tapes 44 and prevent the folders from curling up as they pass through the machine. The block 160 is firmly locked in place by a set screw 162. A plate 163 is pivotally secured to the block 160 by a nut 164. A spring actuated arm 165 is carried by a rod 166 which in turn is mounted in the block 163. A tape roller 167 is carried by the free end of the arm 165 and is yieldingly held in engagement with the tape 44 by means of the spring 168. The roller 167 can be alined with the tape 44 by merely loosening the bolt 164 and swinging the plate 163. The plate may then be tightened by the bolt 164, whereupon the roller 167 is held in the desired position.

The foregoing structure has numerous improvements over the Patent 1,435,334, these improvements having been clearly pointed out in the present description of the device. The novel means for feeding the folders into the machine, the novel means for placing the wetting roller in inoperative position and for actuating the cut out, the novel structure of the sucker head, and the novel means for actuating the sucker head, are distinct improvements over the form of the device disclosed in the Patent 1,435,334. The device is more accurate in its operation and is provided with numerous adjusting features which permit the device to operate efficiently and to do a neat job to the folder when applying the seal. The device is designed to handle a large number of folders in a relatively short length of time and is practically automatic in its operation. The only necessary thing for the operator to do is to keep the feeding end of the machine well stocked with folders and to move the sealed folders from the opposite end of the machine as rapidly as the folders are sealed. The automatic cut off arrangement takes care of any slip-up that may occur if the folder should not pass through the machine at the desired time. This construction prevents the seals from being removed from the magazine when no folders are passing through the device.

In Figure 17 I have shown a modified form of the feeding mechanism, in which, instead of using a quadrant, such as that shown at 25, I make use of a disk or cylinder, preferably made of rubber. It may happen that the quadrant 25, due to wear, will necessitate replacement, and in Figure 17 I have disclosed a device in which a rubber or resilient disk 190 is held by plates 191, both plates being curved at their bottoms to conform to the curvature of the outer surface of the disk, and one of the plates having an inwardly inclined curve, as shown at 192, to form a gripping portion. A block 193 is used to space the plates 191 apart, while a screw 194 draws them together, so as to firmly hold the rubber disk 190 in position. The plates 191, with the rubber disk, form a frame which is attached to the cross bar 23 by any suitable means, and may be used in lieu of the frame 24 which has the quadrant 25. When a portion of the surface of the rubber disk 190 is worn, the screw 194 may be loosened, the disk may be turned to bring a fresh portion, and the screw may again be tightened, without the necessity of removing the disk 190 from the frame.

I claim:

1. A feeding mechanism comprising endless belts, means for intermittently actuating said belts, adjustable rubber members adapted to be moved toward or away from said belts, and metal casings partially enclosing said members whereby a small portion of said members adjacent to the belts is left exposed.

2. A sealing machine comprising in combination a seal carrying magazine, a sucker head movable into said magazine, means for placing said sucker head under a vacuum, whereby said head is adapted to remove a seal from said magazine, a booklet feeding mechanism including a grooved wheel, and a finger, said finger being normally disposed in said groove, and said finger being operatively connected to said head to cut off said vacuum to the head when said finger is not raised by a booklet passing between said wheel and said finger.

3. The combination with a sucker head, and means for placing said sucker head under a vacuum, of positive means for cutting off the vacuum to said head, said means including a grooved wheel and finger, said finger being disposed in said groove, and said finger cutting off said vacuum when disposed in said groove.

4. In a device of the type described, a frame, a belt, a yoke, links pivotally connected to the arms of said yoke, wheels carried by the free ends of said links, and a swingable arm carried by said frame, said yoke being pivotally connected to the free end of said arm, whereby said yoke can swing in a plane transverse to the plane of said arm, said rollers adapted to contact said belt.

5. In a device of the type described, a frame, an auxiliary frame adjustably carried by said frame, a crimper finger pivotally secured to said auxiliary frame, a roller carried by said auxiliary frame, said finger adapted to swing so as to dispose the end of the finger adjacent to said roll fingers having their ends disposed adjacent to said roller and being carried by said auxiliary frame and a roller adapted to contact with said first named roller, said pivotal finger and second named fingers being adapted to contact with the seal of a folder until the seal is received between said rollers.

6. In a device of the type described, a hollow shaft, a casing disposed on said shaft, a transverse bore extending through said shaft and said casing, a plunger slidably mounted in said bore and having an annular groove in communication with the bore of said shaft, a sucker head carried by said plunger and being in communication with said groove, and means for placing the bore of said shaft under a vacuum.

7. In a device of the type described, a hollow shaft, a casing disposed on said shaft, a transverse bore extending through said shaft and said casing, a plunger slidably mounted in said bore and having an annular groove in communication with the bore of said shaft, a sucker head carried by said plunger and being in communication with said groove, means for placing the bore of said shaft under a vacuum, means for rotating said shaft through an arc of 180 degrees, and means for moving said sucker head after each movement of said shaft.

8. In a device of the type described, a hollow shaft, a casing disposed on said shaft, a transverse bore extending through said shaft and said casing, a plunger slidably mounted in said bore and having an annular groove in communication with the bore of said shaft, a sucker head carried by said plunger and being in communication with said groove, means for placing the bore of said shaft under a vacuum, means for rotating said shaft through an arc of 180 degrees, means for moving said sucker head after each movement of said shaft, and means for preventing the movement of the shaft beyond an arc of 180 degrees.

9. A device of the type described comprising a rotating shaft, a sucker head carried by said shaft, a quadrant-shaped plate carried by said sucker head, and a wetting roller adapted to be brought into engagement with said sucker head, said roller being set into rotation by said plate before coming into contact with said sucker head.

10. A sealing machine comprising in combination a seal carrying magazine, a sucker head movable into said magazine, means for placing said sucker head under a vacuum, whereby said head is adapted to remove a seal from said magazine, a booklet feeding mechanism including a member positively actuated by a booklet, means connecting said member with the means for producing the vacuum, whereby the sucker head will be placed under vacuum only when said member is actuated by a booklet.

11. In a sealing machine, a sucker head, a wetter roller, means for swinging said sucker head past said roller so as to cause said sucker head to contact with said roller, and a plate disposed adjacent to said sucker head and being swung with said sucker head, said plate being adapted to contact with said roller to rotate said roller before the roller engages with said sucker head.

12. In a sealing machine, a sealing head, a sucker head carried by said sealing head, means for rotating said sealing head, a wetter roller a plate carried by said sealing head, said roller being adapted to contact with a seal carried by said sucker head after said roller has been rotated by said plate.

13. An idler support comprising a block adapted to be adjustably secured to a rod, a plate pivotally secured to said block, means for locking said plate in adjusted position, a spring pressed arm pivotally carried by said plate, and an idler roller carried by said arm, said roller adapted to be yieldingly held in engagement with a tape.

14. In a sealing machine, a shaft having a transverse bore therein, a rod slidably mounted in said bore, a sucker head carried by said rod, an arm having its free end disposed adjacent to said shaft, a second arm having its free end disposed adjacent to said shaft and spaced from said first named arm, means for rotating said shaft, whereby said sucker head is alternately swung into engagement with said arms and means for actuating said arms when said sucker head engages therewith whereby said sucker head is moved by said arms.

15. In a sealing machine, a shaft, a sucker head carried by said shaft, a gear mounted on said shaft, a quadrant in mesh with said gear, a cam, a roller yieldingly held in engagement with said cam, and yieldable means connecting said roller with said quadrant, whereby said quadrant is actuated by said cam.

16. In a sealing machine, means for positioning a booklet beneath a sucker, said means comprising an arm adapted to contact with a booklet, a rod for supporting said arm, arms having their free ends pivotally secured to the ends of said rod, a cam follower operatively connected to one of said second named arms, and a cam adapted to actuate said cam follower.

17. In a sealing machine, means for intermittently actuating a booklet feed belt, said means comprising rollers for supporting said feed belt, a shaft rigidly connected to one of said rollers, a gear loosely mounted on said shaft, a rack in mesh with said gear, means for operating said rack, a ratchet rigidly connected to said shaft, a frame rigidly connected to said gear, and pawls carried by said frame and being adapted to engage with said ratchet to rotate said ratchet when said frame is rotated in one direction.

18. In a sealing machine a vacuum cut-off comprising a valve casing having a recess therein, pipes communicating with said recess, a valve adapted to close said recess, spring means for normally keeping said valve seated, a cam adapted to open said valve, and auxiliary booklet controlled means for keeping said valve open independently of said cam.

19. In a device of the type described, a frame, an auxiliary frame adjustably carried by said first named frame, a crimper finger adjustably carried by said frame, a wiping member carried by said auxiliary frame, and guide fingers having their ends disposed adjacent to said wiping member and being carried by said auxiliary frame.

20. In a sealing machine, a sucker head, a wetter roller means for swinging said sucker head past said roller so as to cause said sucker head to contact with said roller, and an adjustable plate disposed adjacent to said sucker head and being swung with said sucker head, said plate being adapted to contact with said roller to rotate said roller before the roller engages with the sucker head.

21. A feeding mechanism comprising an inclined booklet conveying magazine adapted to feed booklets to the lower end of the magazine by gravity, a booklet contacting member having the greater part of the exterior surface thereof provided with a polished surface, a belt adapted to convey the booklets from the magazine to said member, whereby the booklets disposed adjacent to the member will bear against the polished surface thereof, said member being spaced away from said belt to permit only one booklet to pass between said member and belt at a given time, the portion of the surface of the member disposed adjacent to the belt being adapted to frictionally engage with the surface of a booklet disposed adjacent thereto so as to stop further movement of this booklet if there is another booklet disposed therebeneath, whereby only one booklet will be fed between the members and the belt at a given time.

DONALD RICHARD ROBINSON.